US006839363B2

(12) United States Patent
Lin et al.

(10) Patent No.: US 6,839,363 B2
(45) Date of Patent: Jan. 4, 2005

(54) DIGITAL CONTROL OF ACTIVELY MODE-LOCKED LASERS

(75) Inventors: Hong Tony Lin, Palo Alto, CA (US); Chunglin Lee, San Jose, CA (US); Perry Neos, Milpitas, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 36 days.

(21) Appl. No.: 10/101,532

(22) Filed: Mar. 18, 2002

(65) Prior Publication Data

US 2002/0176452 A1 Nov. 28, 2002

Related U.S. Application Data

(60) Provisional application No. 60/276,784, filed on Mar. 16, 2001.

(51) Int. Cl.[7] .......................... H01S 3/098; H01S 3/08; H01S 3/13
(52) U.S. Cl. ...................................... 372/18; 94/29.011
(58) Field of Search ...................... 372/18, 6.94, 29.011

(56) References Cited

U.S. PATENT DOCUMENTS

| | | | |
|---|---|---|---|
| 4,025,875 A | | 5/1977 | Fletcher et al. |
| 5,040,896 A | * | 8/1991 | Moslehi ...................... 356/453 |
| 5,042,898 A | | 8/1991 | Morey et al. ................. 585/37 |
| 5,229,575 A | | 7/1993 | Waller et al. ................ 219/213 |
| 5,274,659 A | | 12/1993 | Harvey et al. ................ 372/25 |
| 5,381,426 A | | 1/1995 | Fontana et al. .............. 372/18 |
| 5,440,113 A | * | 8/1995 | Morin et al. ................. 250/205 |
| 5,469,257 A | | 11/1995 | Blake et al. ................. 356/350 |
| 5,573,860 A | | 11/1996 | Hirano et al. ............... 428/617 |
| 5,574,739 A | | 11/1996 | Carruthers et al. ........... 372/29 |
| 5,590,142 A | | 12/1996 | Shan .......................... 372/18 |
| 5,646,774 A | | 7/1997 | Takara et al. ................ 372/18 |
| 5,691,989 A | * | 11/1997 | Rakuljic et al. ............. 372/20 |
| 5,723,856 A | * | 3/1998 | Yao et al. .............. 250/227.11 |
| 5,828,680 A | | 10/1998 | Kim et al. ................... 359/340 |
| 5,835,199 A | | 11/1998 | Phillips et al. .............. 318/779 |
| 5,850,305 A | * | 12/1998 | Pidgeon ...................... 398/193 |
| 5,887,093 A | | 3/1999 | Hansen et al. ................ 385/27 |
| 5,889,803 A | | 3/1999 | Pfeiffer et al. ............... 372/34 |
| 5,911,015 A | | 6/1999 | Bigo .......................... 385/91 |
| 5,917,179 A | * | 6/1999 | Yao ....................... 250/227.11 |
| 5,917,188 A | * | 6/1999 | Atkinson et al. ...... 250/339.13 |
| 5,926,492 A | * | 7/1999 | Yoshida et al. ................ 372/6 |
| 5,956,355 A | | 9/1999 | Swanson et al. .............. 372/20 |

(List continued on next page.)

FOREIGN PATENT DOCUMENTS

| | | |
|---|---|---|
| EP | 0 723 320 A2 | 1/1996 |
| EP | 1 030 472 A2 | 2/2000 |

OTHER PUBLICATIONS

Nakazawa et al.; Nonlinear Pulse Transmission Through an Optical Fiber at Zero–Average Group Velocity Dispersion; Mar. 1996; Photonics Technology Letters, vol. 8, No. 3.

Weidman et al; A Novel Negative Expansion Substrate Material for Athermalizing Fiber Bragg Gratings; Sep. 1996; 22nd European Conference on Optical Communication.

(List continued on next page.)

*Primary Examiner*—Don Wong
*Assistant Examiner*—Hung Tran Vy
(74) *Attorney, Agent, or Firm*—Fish & Richardson P.C.

(57) ABSTRACT

Digital control of actively mode-locked lasers where an active feedback control system is implemented to include a digital processor such as a microprocessor. The digital processor digitally extracts noise information from multiple monitor signals generated from the laser output and digitally diagnoses the operating condition of the laser based on the noise information. Based on the operating condition of the laser, the digital processor generates control signals to adjust the laser cavity to establish or regain the mode locking condition and to maintain the mode locking by reducing the output noise.

20 Claims, 8 Drawing Sheets

U.S. PATENT DOCUMENTS

| | | | | |
|---|---|---|---|---|
| H1813 H | | 11/1999 | Kersey | 372/94 |
| 5,999,293 A | * | 12/1999 | Manning | 398/52 |
| 6,114,671 A | | 9/2000 | Wehner et al. | 219/497 |
| 6,125,130 A | * | 9/2000 | Schmitt et al. | 372/31 |
| 6,147,795 A | | 11/2000 | Derbyshire et al. | 359/337 |
| H1926 H | | 12/2000 | Carruthers et al. | 375/6 |
| 6,262,828 B1 | | 7/2001 | Akiyama et al. | 359/237 |
| 6,266,457 B1 | | 7/2001 | Jacob | 385/11 |
| 6,313,941 B1 | | 11/2001 | Suzuki et al. | 359/337 |
| 6,330,254 B1 | * | 12/2001 | Hung | 372/20 |
| 6,330,255 B1 | * | 12/2001 | Hung | 372/20 |
| 6,330,383 B1 | | 12/2001 | Cai et al. | 385/37 |
| 6,333,941 B1 | * | 12/2001 | Hung | 372/20 |
| 6,373,867 B1 | | 4/2002 | Lin et al. | 372/18 |
| 6,389,046 B1 | | 5/2002 | Stayt, Jr. et al. | 372/29.02 |
| 6,567,436 B1 | * | 5/2003 | Yao et al. | 372/32 |
| 6,762,869 B2 | * | 7/2004 | Maleki et al. | 359/239 |

OTHER PUBLICATIONS

Akimoto, Koji, Yoshitada Katagiri, Ken–Ichi Suziki, and Shinji Nagaoka. "Widely Tunable Mode–Locked Laser Diodes Using Optical Disk Filter." *IEEE Photonics Technology Letters* 12.6 (Jun. 2000) 615–617.

Bakshi, B. and P.A. Andrekson. "Pulse chirp control in an actively modelocked fibre laser using a dual–drive variable–chip modulator." *Electronics Letters* 36.4 (Feb. 17, 2000) 325–327.

Bergano, Neal S., C.R. Davidson, C.J. Chen, B. Pederson, M.A. Mills, N. Ramanujam, H.D. Kidorf, A.B. Puc, M.D. Levonas, and H. Abdelkader. "640 Transmission of Sixty–four 10 Gb/s WDM Channels Over 7200km With 0.33 (bits/s)/Hz Spectral Efficiency." *OFC/IOOC '99 Technical Digest: Optical Fiber Communication Conference and the International Conference on Integrated Optics and Optical Fiber Communication.* San Diego, California, Feb. 23, 1999. PD2–1 –PD2–3.

Carruthers, Thomas F. and Irl N. Duling III. "10–Ghz, 1.3–ps erbium fiber laser employing soliton pulse shortening." *Optics Letters* 21.23 (Dec. 1, 1996) 1927–1929.

Carruthers, Thomas F. and Janet W. Lou. "A dispersion–managed fiber laser: A Dispersion–Managed, Harmonically Mode–Locked Fiber Laser." TFC LEOS '99.

Carrunthers, Thomas F., Moshe Horowitz and Curtis R. Menyuk. "Dispersion management in a harmonically mode–locked fiber soliton laser." *Optics Letters* 25.3 (Feb. 1, 2000) 153–155.

Carruthers, Thomas F., Michael L. Dennis, Irl N Duling, III, Moshe Horowitz, and Curtis R. Menyuk. "Enhanced stability of a dispersion–managed, harmonically mode–locked fiber laser." *CLEO '99/Tuesday Morning.* 1999. 101–102.

Grigoryan, V.S., T. Yu, E.A. Golovchenko, C.R. Menyuk, and A.N. Pilipetskii. "Dispersion–managed soliton dynamics." *Optics Letters* 22.21 (Nov. 1, 1997) 1609–1611.

Horowitz, Moshe, Curtis R. Menyuk, Thomas F. Carruthers, and Irl N. Duling, III. "Dispersion management in an actively modelocked fiber laser with Kerr nonlinearity." *CLEO '99/Tuesday Morning.* 1999. 102–103.

Horowitz, Moshe, Curtis R. Menyuk, Thomas F. Carruthers, and Irl N. Duling, III. "Pulse Dropout in Harmonically Mode–Locked Fiber Lasers." *IEEE Photonics Technology Letters* 12.3 (Mar. 3, 2000) 266–268.

Nakazawa, Masataka and Eiji Yoshida. "A 40–GHz 850–fs Regeneratively FM Mode–Locked Polarization–Maintaing Erbium Fiber Ring Laser." *IEEE Photonics Technology Letters* 12.12 (Dec. 2002) 1613–1615.

Nakazawa, M., H. Kubota, A. Sahara, and K. Tamura. "Marked Increase in the Power Margin Through the Use of a Dispersion–Allocated Soliton." *IEEE Photonics Technology Letters* 8.8 (Aug. 1996) 1088–1090.

Smith, N.J., N.J. Doran, F.M. Knox, and W. Forysiak. "Energy–scaling characteristics of solitons in strongly dispersion–managed fibers." *Optics Letters* 21.24 (Dec. 15, 1996) 1981–1983.

Smith, N.J., F.M. Knox, N.J. Doran, K.J. Blow and I. Bennion. "Enhanced power solitons in optical fibres with periodic dispersion management." *Electronics Letters* 32.1 (Jan. 4, 1996) 54–55.

Weidman, D.L., G.H. Beall, K.C. Chyung, G.L. Francis, R.A. Modavis, and R.M. Morena. "A Novel Negative Expansion Substrate Material for Athermalizing Fiber Bragg Gratings." $22^{nd}$ *European Conference on Optical Communication: Proceedomgs vol.* 1. Oslo, Norway Sep. 15–19, 1996. 1.62–1.64.

* cited by examiner

US 6,839,363 B2

DIGITAL CONTROL OF ACTIVELY MODE-LOCKED LASERS

This application claims the benefit of U.S. Provisional Application No. 60/276,784 filed on Mar. 16, 2001, the entire disclosure of which is incorporated herein by reference as part of this application.

BACKGROUND

This application relates to control and stabilization of lasers such as actively mode-locked lasers formed in fibers and other optical media.

Actively mode-locked lasers may include a laser cavity enclosing a laser gain medium to produce laser oscillation and an intra-cavity optical modulator to lock different laser modes supported by the laser cavity in phase to produce laser pulses. Either the amplitude or the phase of the intra-cavity optical field may be modulated at a frequency equal to a multiplicity of the mode spacing to achieve the mode locking. Such lasers may be designed to produce high-quality short optical pulses at a very high bit rate such tens of GHz or higher for various applications, including fiber communication systems.

The laser cavity in an actively mode-locked laser performs a number of functions. For example, the laser cavity provides an optical feedback mechanism to bounce light back and forth multiple times through the laser gain medium for optical amplification. The laser cavity also selects one or more proper lasing frequencies within the gain spectral profile of the laser gain medium by requiring each selected frequency of light to be in resonance with the laser cavity. As a further example, the laser cavity operates to confine the light rays of the laser approximately along the optic axis of the laser cavity by filtering out light rays in other directions. As a result, the geometry of the laser cavity affects various characteristics of the laser.

The geometry of the laser cavity, however, may change with respect to many factors, such as environmental conditions (e.g., temperature or vibrations) and its own aging process. One notorious factor is a change in the cavity length. Since a change in the laser cavity generally varies with time, it is therefore desirable to provide an active control mechanism to stabilize the laser cavity by dynamically adjusting the cavity.

SUMMARY

This application includes techniques of active laser control and stabilization of actively mode-locked lasers based on digital control circuitry and algorithms. An active feedback control system is implemented to include a digital processor such as a microprocessor that digitally extracts noise information from multiple monitor signals generated from the laser output and digitally diagnoses the operating condition of the laser based on the noise information. Based on the operating condition of the laser, the digital processor generates control signals to adjust the laser cavity to establish or regain the mode locking condition and to maintain the mode locking by reducing the output noise.

DETAILED DESCRIPTION

The digital feedback control mechanisms described in this application may be used in various types of actively mode-locked lasers, including lasers with ring cavities and non-ring cavities (e.g., Fabry-Perot cavities), lasers with fibers as the gain media or other forms of materials as gain media (e.g., gases, liquids, and solids such as crystals). The following describes embodiments of digital feedback control mechanisms in actively mode-locked fiber lasers as examples.

In general, an active mode-locked laser produces laser pulses whose pulse repetition rate is in synchronization with a master clock rate at which the intra cavity modulator modulates the light. If the period of the master clock changes, the pulse repetition rate needs to change accordingly. This is achieved by using the digital feedback control to adjust the total optical path length of the laser cavity for both stabilizing the laser against disturbances to produce a substantially constant pulse repetition rate and synchronizing the laser to the master clock.

The digital feedback control mechanism of this application includes a slow control mechanism to correct slow changes in the cavity geometry, e.g., caused by the temperature drift, and a fast control mechanism to correct sudden changes in the cavity geometry, e.g., caused by vibrations or certain processes in the gain medium. The slow control mechanism may also be used to bias the optical cavity so that the operating point of the fast control mechanism is set within the operating range to allow for control in both directions. The fast cavity control mechanism may be implemented by using a transducer engaged to part of the laser cavity, e.g., a piezo-electric transducer, to adjust the physical length of the laser cavity at a high speed in response to a control signal. As will be described below, a bias stretch produced by the transducer may also be used to adjust the bias of the laser cavity or to operate as a slow control mechanism.

Figure 1:
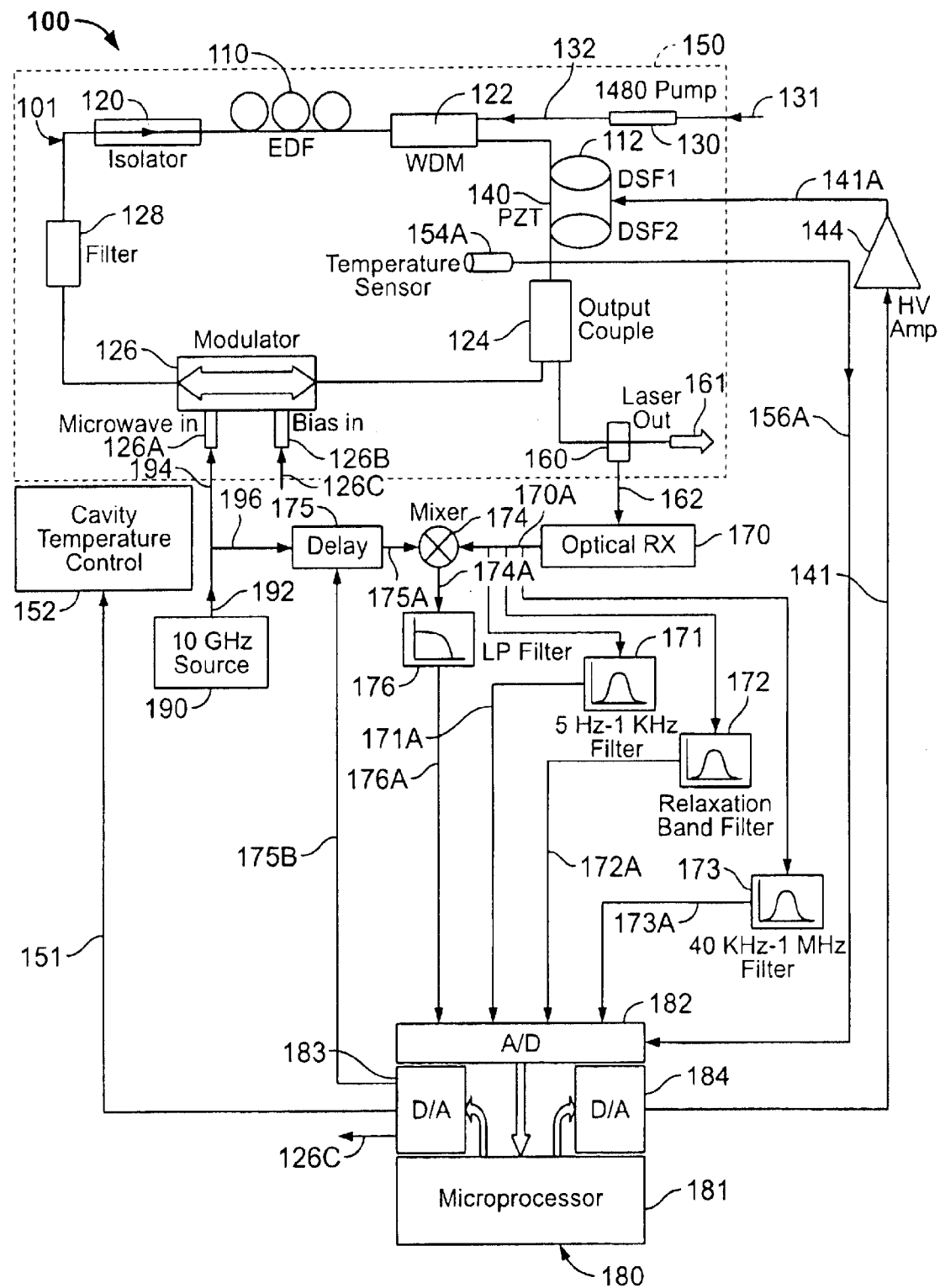
FIG. 1 shows one embodiment of an actively mode-locked fiber laser in a ring cavity design with a digital feedback control system.

FIG. 1 shows one embodiment of an actively mode-locked fiber laser 100 that uses fiber segments to form a closed fiber ring or loop 101 and a digital control feedback system with a digital control module 180. This fiber ring 101 constitutes the laser cavity. Polarization-maintaining single-mode ("PM") fibers or polarizing single-mode fibers may be used in the fiber ring 101 to make it polarization maintaining. A PM fiber is configured to have well-defined principal axes for two mutually orthogonal polarizations. A polarizing fiber has a single principal polarization axis. These two types of fibers can be configured so that a principal axis is essentially not influenced by environmental conditions, such as fiber position, temperature, and stress. Therefore, the polarization of a beam propagating in such a fiber can be maintained. In the following description, the term of "polarization-maintaining fiber" will be used to include any fiber or optical waveguide that can preserve an optical polarization of a beam.

The fiber ring 101 includes a fiber segment 110 which is doped with active ions to produce the desired optical gain for the laser oscillation when excited by energy from an external pump power source. The external pump power source may be electrical or optical. One example of electrical pumping is the excitation by supplying a current to a semiconductor gain medium. In an optical pumping scheme, the pump light source produces light at a pump wavelength generally shorter than the lasing wavelength. The optical gain medium, e.g., the fiber segment 110 in this example, absorbs the pump light to produce the optical gain. When the optical gain in the segment 110 exceeds the total optical loss in the entire ring 101, laser oscillation can be generated. Different dopants can be used to achieve laser oscillations at different wavelengths. For example, atomic transitions in rare-earth ions, such as erbium, holmium, neodymium, samarium, thulium and ytterbium, can be used to produce lasers from visible wavelengths to far infrared wavelengths (e.g., from 0.45 to about 3.5 microns). Er-doped fiber lasers for producing optical pulses at 1.55 micron are particularly useful for optical fiber communication since the optical loss in the commonly used silica fibers is minimum at about 1.55 micron under optical pumping at 980 nm or 1480 nm. Two or more different rare-earth ions can be mixed together to achieve certain pump and laser wavelengths that may not be readily available from a single doping element.

An optical pump source 130 (e.g., a laser) may be used to generate the desired pump light 132 at a proper pump wavelength (e.g., 1480 nm). The pump source 130 may operate in response to an electrical driving signal 131 as in a diode-based pump source where the signal 131 is the driving current to the diode or diodes. An optical coupler 122 such as a fiber coupler is coupled in the fiber ring 101 adjacent to the fiber gain segment 110 to couple the pump light 132 into the gain segment 110. The optical coupler 122 is wavelength selective to couple only light at the pump wavelength and does not couple light at the laser wavelength. An optical bandpass filter 128 may be deployed in the fiber ring 101 to select only the desired laser wavelength to circulate in the fiber ring 101 by suppressing light at other wavelengths. An optical power splitter 124, e.g., a WDM fiber coupler, may be used to split a portion of the laser power at the laser wavelength in the ring 101 to produce a laser output. Another optical coupler 160 is further used to split the laser output into a beam 161 as the final laser output and a monitor beam 162 for monitoring the condition of the laser oscillation and the fiber ring 101 in one or more control feedback loops for stabilizing the laser. An optical isolator 120 may be connected in the fiber ring 101 to ensure a single-directional oscillation in the fiber ring 101 (e.g., the clockwise direction as shown).

A mode-locked laser generally produces multiple longitudinal modes that oscillate simultaneously. A mode-locking mechanism is implemented within the resonator to synchronize the phases of different modes in such a way that the phase difference between any two adjacent modes is a constant. These phase-locked modes constructively add to one another to produce a short pulse. In the laser 100, an intra-cavity optical modulator 126 is coupled in the fiber ring 101 to modulate the light in the fiber ring 101 under a control by a modulator control signal 194 at a modulation frequency. One exemplary implementation of such a modulator is an electro-optic modulator based on the electro-optic effect. A LiNbO$_3$ crystal or other electro-optic material may be used. A Mach-Zehnder configuration may be used in the modulator 126. The modulator 126 may be an amplitude modulator or a phase modulator.

The modulator 126 may include a driver input port 126A for receiving the control signal 194 at the modulation frequency and a bias input port 126B for receiving a bias control signal 126C. A modulator driver 190, such as a RF signal generator or synthesizer, is used to produce the modulator control signal 194 to drive the optical modulator 126. The control signal 194 may be a RF signal at a desired frequency, e.g. tens of GHz, such as 10 GHz, 40 GHz or higher, depending on the requirements of applications. To obtain stable and high-quality short pulses in the laser 100, the total laser cavity length should produce a mode spacing such that an integer multiple of the mode spacing matches the modulation frequency of the modulator 126 with a high accuracy, e.g., a relative deviation less than $10^{-7}$. The digital feedback control in the laser 100 is designed to adjust the length of the fiber the ring 101 to maintain this phase matching condition.

Notably, the bias of the modulator 126 may also affect the phase matching condition and thus should be maintained by the digital feedback control loop at a certain bias value. This bias value sets the operating point in the transfer function of the modulator 126. The bias control signal 126C, as described below, may be generated by the digital feedback control and used as one of control parameters for controlling the laser 100.

For example, when a Mach-Zehnder amplitude modulator is used as the modulator 126, the transfer function is a sinusoidal function of the bias voltage due to the interference of light from the two different optical paths. For purpose of mode locking of the laser 100, the bias should be set adjacent to the bias voltage $V_{B0}$ where a complete destructive interference occurs to produce an output minimum. Typically, the DC bias may be set as close as possible to $V_{B0}$ to achieve a large time derivative of the slope of the transmission of the modulator as a function of time, i.e., the second derivative of the transmission with respect to time. Under this condition, the mode-locked pulses are discovered to be narrow and stable. On the other hand, the bais voltage should be sufficiently deviated from $V_{B0}$ to avoid mode locking at the second harmonic frequency of the driving modulation frequency in order to achieve stable mode locking at the modulation frequency. For a given Mach-Zehnder modulator where the half-wave voltage is $V_\pi$, the bias voltage may be set at $V_{bias} \approx V_{B0} \pm V_\pi/10$ range.

The bais of the optical modulator 126, however, may drift away from the desired point in the transfer function. Such a drift in a Mach-Zehnder modualtor, for example, is known to be caused by various factors. This drift may adversely affect the mode-locking of the laser 100 and to increase the noise in the laser output. Hence, as will be described in lase sections, the digital feedback control may be designed to monitor such drift and to correct the drift to maintain the proper bias during operation of the laser 100.

The optical dispersion in the fiber ring 101 may be reduced to a desirable small amount by design, e.g., using low-dispersion optical materials. When the dispersion of the fiber ring 101 is unacceptable, a dispersion compensating fiber segment 112 may be included in the fiber ring 101 to produce an optical chromatic dispersion that negates the chromatic dispersion in the fiber ring 101 caused by other fibers and the fiber gain segment 110. This dispersion compensating fiber segment 112 may be configured to operate in two different modes. In the first mode, the fiber 112 is designed to reduce or minimize the overall dispersion in the fiber ring 101 and hence to shorten the pulse width. In the second mode, the fiber 112 is designed to provide a condition where the self-phase modulation and the group velocity dispersion are balanced to produce optical solitons rather than regular optical pulses. As illustrated, the dispersion compensating fiber segment 112 may include two fiber segments DSF1 and DSF2 with opposite dispersions to achieve a desired net dispersion in the ring 101.

The laser 100 uses a thermally controlled chamber or housing 150 to enclose and thermally stabilize the fiber ring 101 at or near a desired cavity temperature as the surrounding temperature changes by either heating up the chamber or extracting heat from the chamber. A temperature control unit 152 is thermally coupled to the chamber 150 to actively control the temperature of the fiber ring 101 in response to a control signal 151. In some implementations, the cavity temperature is usually kept higher than the temperature of the surroundings. The temperature control unit 152 may include an adjustable electrical heating element or a thermal electrical element which may operate to heat or cool. One or more temperature sensors 154A are distributed in the chamber 150 to measure the temperature therein. The sensor signal 156A from the temperature sensor 154A is fed to the digital control module 180 of the laser 100 that generates the control signal 151 based on the signal 156A. This forms one active control loop in the laser 100.

This thermal control mechanism may be used as part of the slow control mechanism to mitigate any variation in the total cavity length caused by a change in temperature to assist maintenance of the phase-matching condition for mode locking. In addition, the thermal control mechanism may also operate as a bias mechanism to set the total cavity length at a desired bias value so that the operating point of the fast control mechanism is set within the operating range to allow for control in both directions.

The laser 100 also has a cavity length controller 140, such as a fiber stretcher coupled in the fiber ring 101, e.g., at the fiber segment 112, to control the overall optical path length of the fiber ring 101 against fluctuations that cause noise in the laser output and degrade the mode-locking phase-matching condition. The fiber stretcher 140 operates to change the length of the fiber segment to which it is engaged at a speed higher than the thermal control chamber 150 to provide a high-speed adjustment to the cavity length. A control signal 141A, which is initially generated from the digital control module 180 as a control signal 141 and is amplified by a high-voltage amplifier 144, is used to control the operation of the fiber stretcher 140. This forms the second control loop of the laser 100 and operates as the fast control mechanism. The control signal 141A may include an AC signal portion to dither the fiber stretcher 140 to control the overall cavity length at a desired value to maintain the mode-locking phase-matching condition and to minimize the output noise. In one implementation, a piezo-electric transducer (PZT) may be used as the fiber stretcher, where different PZT voltages of the fiber stretcher correspond to different values of the cavity length. The fiber stretcher 140 is generally enclosed in the chamber 150. The fiber stretcher 140 may also be coupled to control the physical length of the gain fiber 110. Both fiber segments 110 and 112 may be actively controlled by fiber stretchers as the fast control mechanism.

In addition, similar to the thermal control, the fiber stretcher 140 may be biased by a DC signal portion in the control signal 141A to cause a bias stretch in the fiber ring 101 to set the total cavity length at a desired value so that the operating point of the fast control mechanism is set within the operating range to allow for control in both directions. At or near this bias stretch point, the fiber stretcher 140 may be operated to adjust the total length of the fiber ring 101 at a high speed to compensate for laser noise and fluctuations. This bias stretch may be tuned by the digital control module 180 as another slow control mechanism. Either or both of the temperature of the chamber 150 and this bias stretch control may be used to provide the slow control mechanism to correct slow or long-term drifting of the total cavity length.

The performance of the laser 100 is monitored by using an optical detector 170 to convert the optical monitor signal 162 into an electronic monitor signal 172. This optical-to-electronic interface provides a common feedback for different control loops in the digital feedback control system, including the thermal control, the fiber stretcher 140, the modulator bias, and a phase delay in another feedback signal to the digital control module 180 as will be described below.

The digital feedback control system for the laser 100 includes the digital control module 180, an electrical delay unit 175, an electrical signal mixer 174, a low-pass filter 176 and one or more electrical bandpass filters 171, 172, 173. The digital control module 180 is the backbone of the control system and includes a digital processor 181 and circuit interface with the analog part of the feedback control system such as the bandpass filters, the delay unit 175, the bias port 126B of the modulator 126, the thermal control 152, and the fiber stretcher 140. As illustrated, the circuit interface may include an analog-to-digital circuit 182 (e.g., an array of analog-to-digital converters) for converting feedback analog signals into digital signals to be processed by the digital processor 181. Digital-to-analog converters 183 and 184 are also included to convert the control signals produced by the digital processor 181 into analog signals for operating different control elements in the laser 100. The digital processor 181 may be a suitable microprocessor that has a non-volatile memory for storing laser control parameter data and can be programmed to execute the operations as outlined below.

The following sections will first describe feedback mechanisms of the control system and then the control operations under the control of the digital processor 181 based on the information from the feedback signals.

The digital control module 180 receives feedback signals from the laser cavity in a number of ways. The optical detector 170 coverts the optical monitor signal 162 into an electrical detector signal 170A. This electrical detector signal 170A is split into several signals which are then processed electronically in different ways to produce different feedback signals to the digital control module 180.

The first feedback signal 176A to the digital control module 180 is produced by the mixer 174 and the low-pass filter 176 as a phase detector. A reference signal 196 is produced by splitting a portion out of the modulation signal 192 to mix with a portion of the detector signal 170A to produce a mixed signal 174A. The reference signal 196 oscillates at a reference frequency, i.e., the modulation frequency of the optical modulator 126. Hence, the lowest frequency term in the mixed signal 174A is the signal component with a phase that represents the frequency difference between the modulation frequency and the multiplicity of the longitudinal mode spacing of the laser cavity. This signal component oscillates sinusoidally at the above frequency difference. The low-pass filter 176 filters out other signal components with higher oscillating frequencies and selects the above signal component as the filtered output signal 176A. The low-pass filter 176 may be configured to set its cutoff frequency according to the frequency difference to be corrected by the control system, i.e., the tuning range of the cavity length. For example, this cutoff frequency may be on the order up to the kilo hertz range, such as 5 to 6 KHz.

Hence, the digital processor 181 may be programmed to process the phase of the filtered output signal 176A to determine the deviation of the cavity length from the desired phase-matched cavity length and the direction of such deviation. Hence, the filtered signal 176A provides an error signal for the control system to detect the error in the cavity length. Accordingly, based on the detected error, the digital processor 181 is programmed to generate the control signal 141 to adjust the cavity length to reduce the error to maintain the mode-locking condition after the mode-locking condition is established.

The above operation for maintaining the mode-locking condition in the laser is one of a number features implemented in the digital feedback control. The digital feedback control may be designed to perform complex digital processing of information contained in the detector signal 170A to obtain information on the laser in addition to the phase information in the signal 176A for controlling other aspects of the laser 100.

For example, the filtered signal 176A from the output of the mixer 174 is a sinusoidal signal with respect to the phase difference between the signals 175A and 170A. The amplitude of the slope of the signal 176A is largest when the phase difference is set a selected value so that the amplitude of the signal 176A is at zero. If at this selected phase difference value, the mode-locking phase-matching condition is met, the amplitude of the signal 176A would be most sensitive to the deviation of the cavity length from the phase-matched cavity length. Therefore, the phase delay of the phase delay unit 175 may be adjusted to set the amplitude of the signal 176A to zero when the phase locking phase matching condition is satisfied. To achieve a sensitive feedback control, this condition at the mixer should be checked during the normal operation of the laser and the phase delay unit 175 should be adjusted to restore that condition should the mixer drifts away from this desirable condition. As will be described below, the digital processor 181 is programmed to use information obtained from feedback signals other than the signal 176A to adjust the phase delay unit 175. This is because the signal mixing by the mixer 175 and the low-pass filtering by the filter 176 eliminate certain useful information on the laser from the signal 176A and thus the digital processor 181 cannot have sufficient information based on the signal 176A alone to properly control the phase delay unit 175.

For another example, digital processor 181 may also programmed to adjust the bias in the optical modulator 126 to maintain the proper bias condition as previously discussed. Similar to the control of the phase delay unit 175, the digital feedback control may be designed to monitor and correct the bias drift based on information obtained from feedback signals other than the signal 176A.

Furthermore, the digital feedback control may be programmed to adjust the laser from a non-mode-locking condition to a mode-locking condition when the laser is initially not mode locked. Under the non-mode-locking condition, the signal 176A generally fluctuates randomly and hence does not provide useful information about the laser. Therefore, information obtained from feedback signals other than the signal 176A have to be supplied to the digital processor 181 to set laser parameters to either establish the mode lock for the first time or to restore the mode lock that was previously achieved.

To achieve the above and other control functions, the control system in the laser 100 is designed to use one or more electrical bandpass filters to provide additional feedback signals to the digital control module 180. More specifically, the laser 100 provides bandpass filters 171, 172, and 173 connected in parallel at different spectral ranges to obtain different filtered signals 171A, 172A, and 173A, respectively, from the common detector output signal 170A. Such filtered signals include noise and other information of the laser. The filter 171 is designed to have a transmission band at a low frequency range to monitor the low-frequency spectral components in the laser output, e.g., 5 Hz to 1 KHz for a fiber ring laser. The filter 172, also called "energy relaxation filter", is designed to have a transmission band at a middle frequency range to monitor the spectral signals mainly associated with energy relaxation processes in the laser cavity, e.g., the frequency corresponding to the inverse of the laser cavity decay time. In some fiber ring lasers, this range may be from 30 KHz to 36 KHz or in a wider range from 5 KHz to 50 KHz. The filter 173 is designed to have a transmission band at a high frequency range to monitor the high-frequency spectral signals in the laser output, e.g., 40 KHz to 1 MHz for a fiber ring laser. The above use of the three bandpass filters to cover the low, middle and high frequency range of the laser output is just an example and more filters may be used to further divide the spectrum. Such filter output signals are used by the digital processor 181 to extract vital information on the state of the laser that may otherwise not available from the filtered signal 176A. In particular, these filter output signals include information on the noise of the laser output and thus may be used to control the bias on the optical modulator 126, the phase delay unit 175, and adjust the laser from a non-mode-locking condition to a mode-locking condition.

Another feedback signal is the signal 156A from the temperature sensor 154A that represents the temperature within the thermal chamber 150. This signal 156A may be used in at least two operations. First, it allows the digital processor 181 to determine the difference between the actual temperature and a desired temperature and thus controls the thermal control 152 accordingly to correct any temperature deviation. Secondly, the signal 156A allows the digital processor 181 to control the thermal control 152 to set the chamber 150 to a desired new temperature to properly bias the total cavity length.

The digital processor 181 is designed to have control intelligence by being programmed based on at least the following three operation algorithms: achieving mode-lock for the first time, achieving mode-lock not for the first time, and maintaining mode-lock.

The operation algorithm for achieving mode-lock for the first time includes the following steps.

1. Set the temperature at the middle of the operational temperature range. Note that this may also be achieved by either biasing the fiber stretcher 140 with a DC PZT voltage or controlling the temperature of the thermal control chamber 150, or a combination of both.

2. Under the proper bias in the modulator 126, the PZT voltage in the fiber stretcher is swept through its whole tuning range, while recording the output signals of the bandpass filters 171, 172, and 173.

3. Search through the collected data from all the filters 171, 172, and 173 to look for a mode-lock minimum value for the PZT voltage. If the proper bias in the modulator 126 is uncertain, then the bias in the modulator 126 may be scanned at each PZT voltage to collect the output data from the bandpass filters. The filter output as a function of both the PZT voltage and the modulator bias may be digitally processed to search form the values for the PZT voltage and the modulator bias where the filter output energy is minimized.

4. If there is a potential mode-lock minimum, further analyze the relaxation filter data obtained from the filter 172 by running a "resolve minimum" sub routine shown in FIG. 2. If steps 3 and 4 do not agree then a mode-lock minimum is treated as out of the range within the current PZT voltage sweep. Under this condition, the temperature setting is changed to another value to repeat the procedures from steps 2–4. If steps 3 and 4 arrive at the same value or the approximately the same value in the PZT voltage, then a mode-lock minimum exists around the neighborhood of that PZT value.

5. Set the fiber stretcher 140 to be biased at a DC voltage of the above PZT value. Optionally, another "find minimum" sub routine in FIG. 3 may be executed to search for the real minimum PZT voltage in the vicinity of the PZT value for the mode-lock minimum in step 4. The DC bias voltage on the fiber stretcher 140 is set at this value.

6. Apply an AC modulation signal on the PZT to dither the PZT voltage around the minimum PZT voltage to keep the relaxation energy in the output 172A of the filter 172 to a minimum. This should also set the energy in the output signal 171A from the filter 171 and the output signal 173A from the filter 173 at their minimums.

7. Under the condition in step 6, the microwave phase delay 175 is adjusted so the mixer output 176A after the low-pass filter 176 is zero to establish the mode-locking condition.

8. Resolve the ambiguity in the slope of the mixer output signal 176A and use the resulted signal as the feedback error for the next step. This ambiguity resolution is to determine the relationship between the direction of the adjustment to the cavity length and sign of the frequency difference between the modulation frequency and the multiplicity of the longitudinal mode spacing of the laser cavity. This relationship is affected by the operating bias point in the Mach-Zehnder modulator 126 relative to the bias point for the complete destructive interference at the modulator output in absence of the RF modulation signal.

9. Adjust the temperature of the laser cavity so that the PZT voltage remains close to the center of its range.

10. Save the mode-lock parameters such as the minimum PZT voltage, the temperature of the laser cavity, and phase delay settings in a non-volatile memory of the digital processor 181.

The operation algorithm for achieving mode-lock not for the first time includes the following steps.

1. Load the previously saved mode-lock parameters from the memory to the digital processor to drive the system to those settings.

2. Sweep the PZT voltage through a small range, while recording the output signals of the bandpass filters 171, 172, and 173.

3. Search through the collected data from all the filters looking for a mode-lock minimum value for the PZT voltage.

4. If there is a potential mode-lock minimum further analyze the relaxation filter data by running the "resolve minimum" sub routine in FIG. 2.

If steps 3 and 4 do not agree then a mode-lock minimum was not within this partial PZT voltage sweep, widen the PZT voltage sweep and repeat the procedure from step 2. If steps 3 and 4 arrive at the same answer, then a mode-lock minimum exist around the neighborhood of that answer. In addition, the optional "find minimum" sub routine in FIG. 3 may be executed to find the real minimum PZT voltage.

5 While dithering the PZT voltage to keep the relaxation energy to its minimum, adjust the microwave phase delay so the mixer output is zero.

6. Adjust the temperature so that the PZT voltage remains close to the center of its range.

7. Save the mode-lock parameters such as the minimum PZT voltage, temperature and phase delay settings in the non-volatile memory to replace previous mode-lock parameters.

Upon establishing the mode-lock condition by performing the operations in either of the above operation algorithms, the digital processor 181 is instructed to carry out the following phase-lock operation algorithm for maintaining the mode-locking condition:

1. Switch the PZT voltage control loop from minimizing the relaxation energy in the output signal from the filter 172 and other filters 171 and 173 to minimizing the mixer output 176A; and 2. Periodically execute the following sub-routine: (1) momentarily switch the PZT voltage control loop back to minimizing the mixer output 176A; (2) minimize the relaxation energy in the output of the filter 172; (3) adjust the phase delay to keep the mixer output at zero; and (4) adjust the cavity temperature to maintain the PZT voltage close to the center of its operating range. This sub-routine is to correct any deviation from the desired phase delay between the signals 175A and the signal 170A for sensitive feedback control on the cavity length.

As noted previously, the bias in the modulator 126 may drift from the desired bias value, e.g., $V_{bias} \approx V_{B0} \pm V_\pi/10$. Hence, the above phase-lock operation algorithm may further include a subroutine for periodically monitoring the bias and readjusting the bias signal 126C to the modulator 126 to reduce any deviation from the desired bias condition. The initial bias voltage 126C may be determined by observing the output of the modulator 126 in absence of the modulation signal 194 by tuning the bias 126C. This procedure, however, is not applicable during operation of the laser 100 in the mode-locking condition because the removal of the modulation signal 194 can destroy the mode lock operation and thus interrupt the laser operation. This bias control subroutine is designed to operate while maintaining the normal mode-locked operation of the laser.

First, the PZT control loop is momentarily switched from minimizing the mixer output 176A to minimizing the relaxation energy in the filter output 172A and the energy in signals 171A and 173A. Second, the PZT voltage is set at a DC value where the relaxation energy is minimized. Third, the bias signal 126C is adjusted to settle at a value where the relaxation energy in the filter output 172A is minimized. Fourth, the temperature of the chamber 150 is adjusted to set the PZT voltage at the center of its operating range. Fifth, the PZT control loop is switched back to minimizing the mixer output 176A.

The time interval for executing either of the phase delay subroutine and the bias subroutine is determined by the drift characteristic time of the laser. The bias subroutine, for example, may be executed every several hours or so for some electro-optic Mach-Zehnder modulators.

Figure 2:
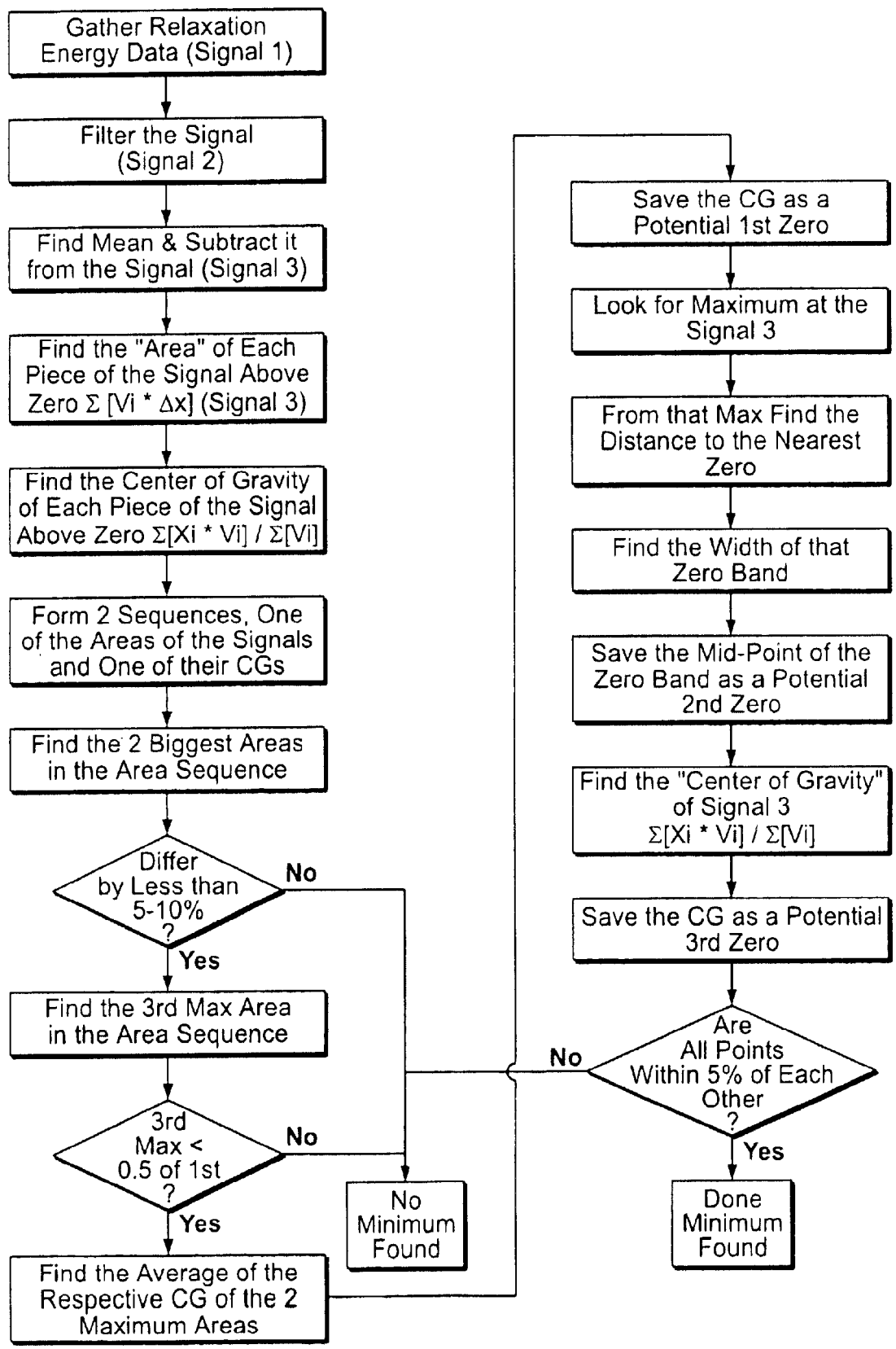
FIGS. 2 and 3 show two operations of the digital processor in the digital feedback control system in FIG. 1.
Figure 4A:
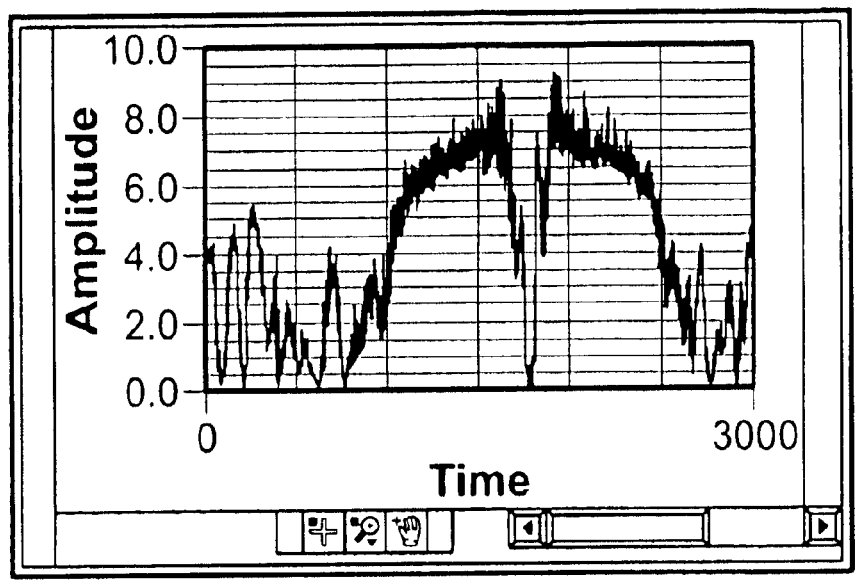
FIGS. 4A, 4B, and 4C show a measured signal from a bandpass filter of the laser in FIG. 1 where the laser has a mode locking condition within the operating range of the PZT fiber stretcher.
Figure 4B:
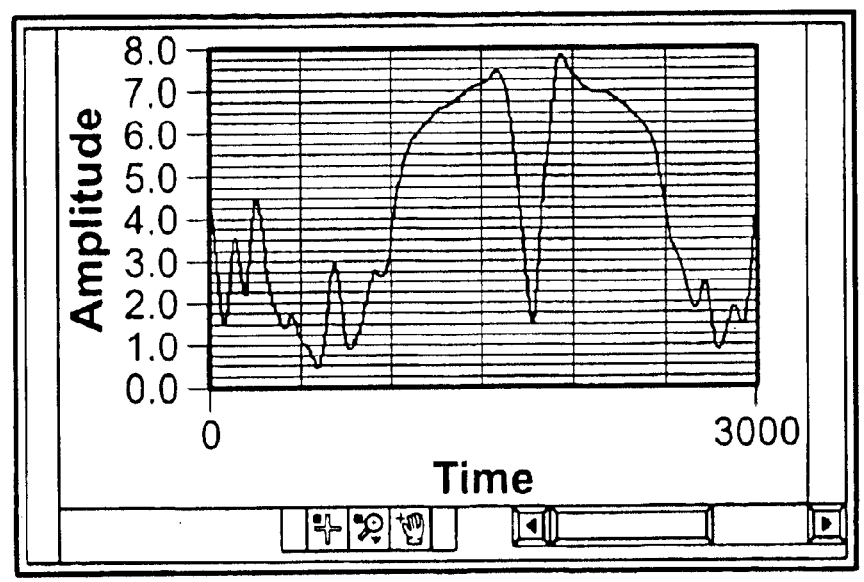
Figure 4C:
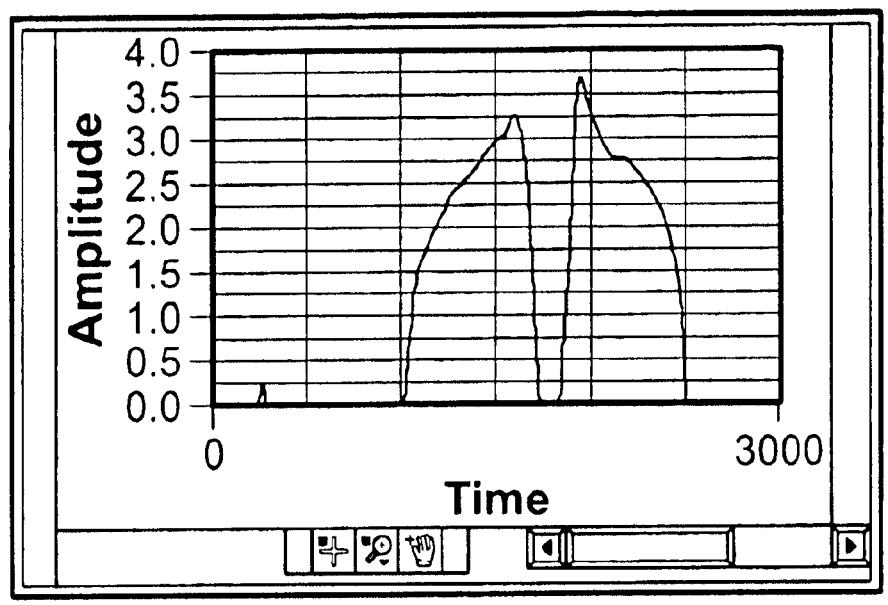

Referring to FIG. 2, the "resolve minimum" sub routine is essentially a digital pattern recognition routine for identifying a true minimum PZT value in the output response of the energy relaxation filter 172 and the output signals of the filters 171 and 173. This minimum PZT value corresponds to a phase-matched cavity length where the noise of the output signal is minimum when the mode lock is achieved. This sub routine as shown in FIG. 2 includes three basic operations. First, the filtered signal 172A is collected as a function of the sweeping PZT voltage in its operating range over a sampling period of time. FIG. 4A illustrates one example of such data from the relaxation filter 172 where the horizontal axis represents the PZT voltage over a sampling period. The amplitude of the signal represents the noise level in the laser output. Next, at each PZT voltage, the mean value of the signal values measured at different times within the sampling period is computed by the digital processor 181 to represent the signal value at the corresponding PZT voltage. FIG. 4B shows the mean value of the signal. The mean value of the signal values over the entire PZT voltage range is computed and is subtracted from the signal at each PZT voltage to achieve a new signal as shown in FIG. 4C. Third, the middle point between the centers of gravity of two areas with signal peaks is computed as the minimum PZT voltage at which the PZT should be biased at.

Figure 5A:
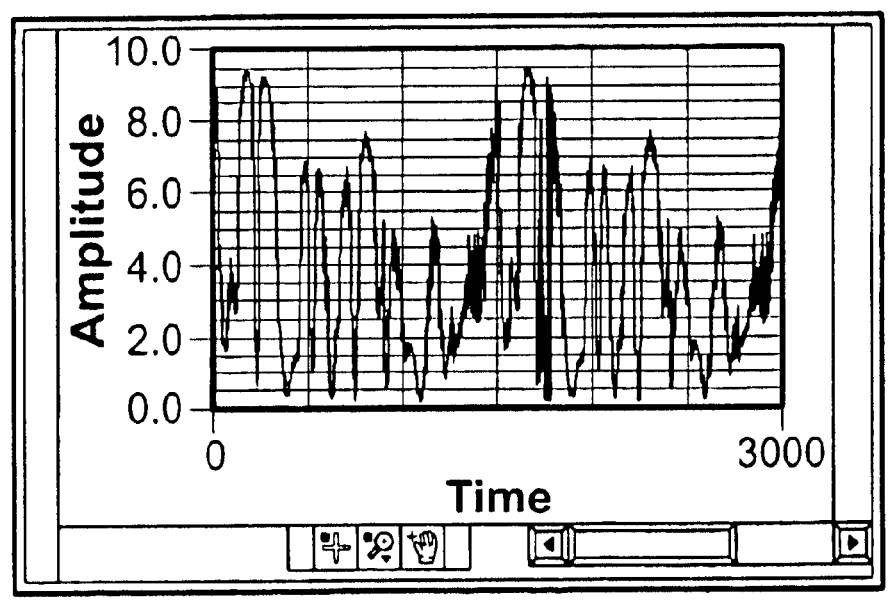
FIGS. 5A, 5B, and 5C show a measured signal from a bandpass filter of the laser in FIG. 1 where the laser does not satisfy a mode locking condition within the operating range of the PZT fiber stretcher.
Figure 5B:
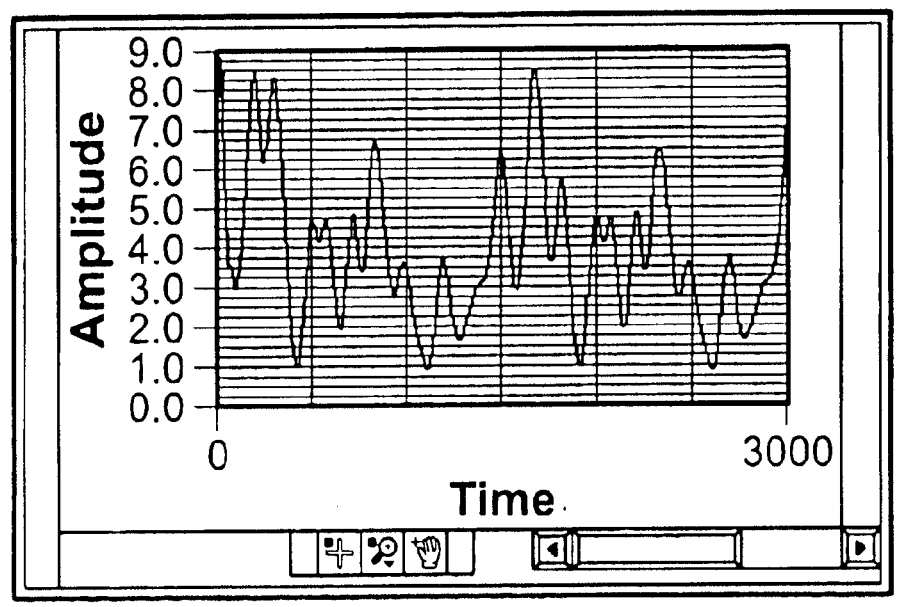
Figure 5C:
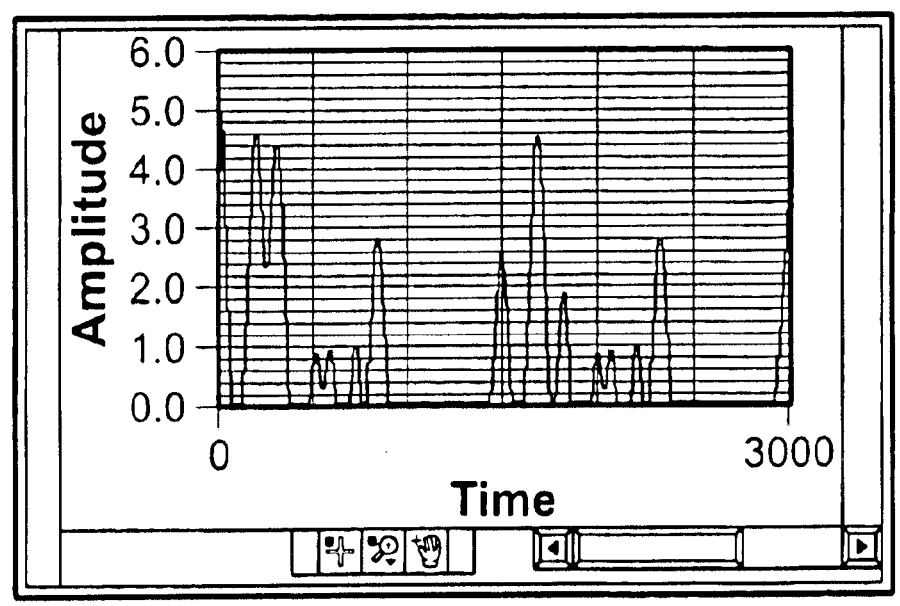

When the total laser cavity length is not properly set at a bias initial length, the laser may not meet the phase-matching condition in the entire sweeping range of the PZT voltage on the fiber stretcher. Under this condition, the output of the filter 172 is random and does not have a minimum area between two signal peaks. This condition is shown by data in FIGS. 5A, 5B, and 5C. To achieve mode locking, the initial cavity length should be adjusted by either changing the operating temperature of the chamber 150 or tuning the DC bias PZT voltage n the fiber stretcher to place the phase-matched cavity length within the operating range of the PZT fiber stretcher.

Figure 3:
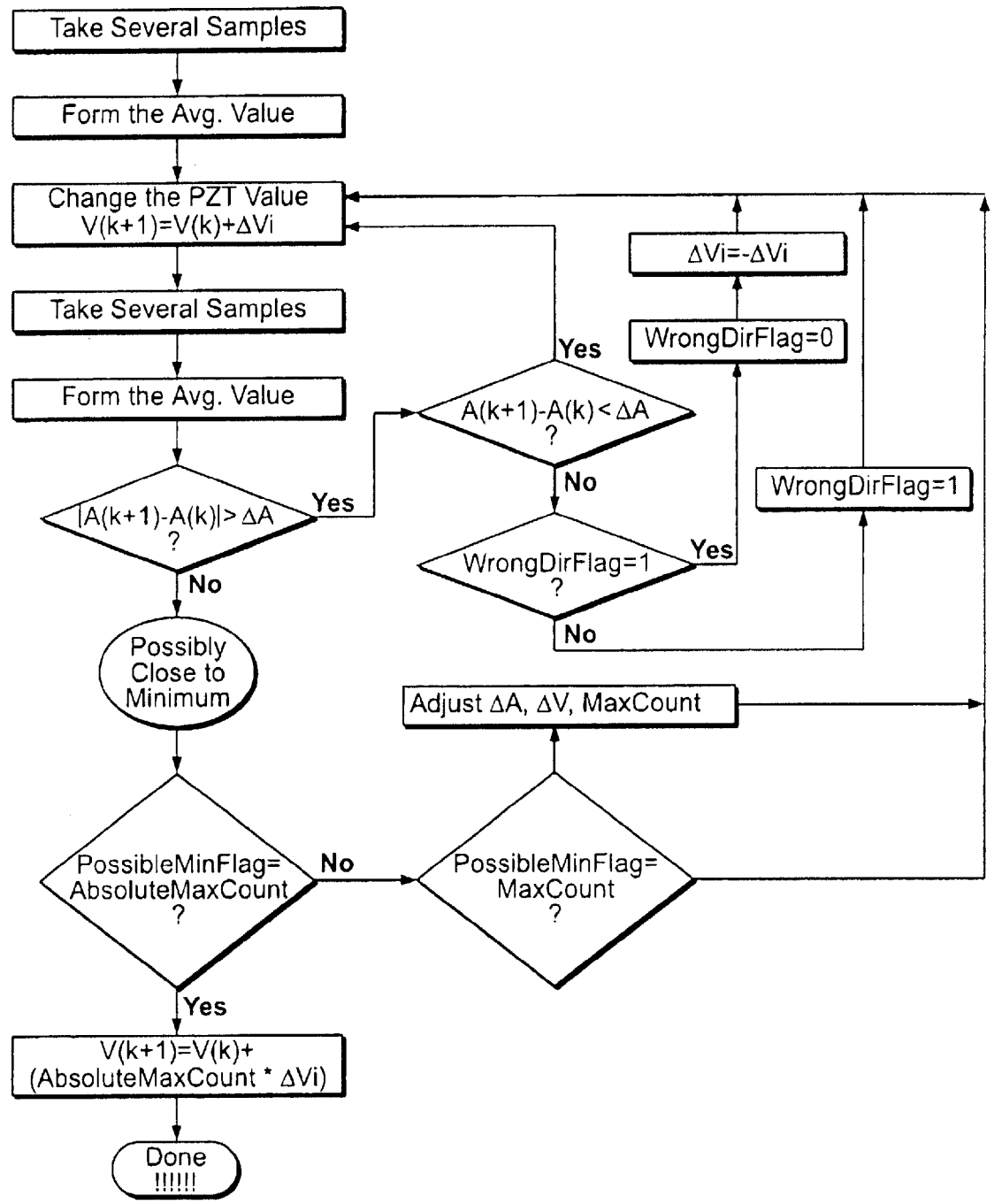

The "find minimum" sub routine in FIG. 3 searches through the vicinity of the minimum PZT voltage from the sub routine in FIG. 2 to find the real minimum PZT voltage. Basically, the digital processor 181 searches by stepping in small increment in both directions achieve this.

The above digital control system allows the feedback control to perform complex diagnostics on the performance of the laser and thus to accurately determine the optimal mode-locking condition of the laser. In particular, the digital control system may be used to set the laser from non-mode-locking condition to a mode-locking condition, automatically without human intervention. Therefore, this system may be advantageous over an analog control system to provide a more self-sustained laser mode-locking and long-term reliability. More specifically, the processing of the filtered output from one or more bandpass filters 171–173 based on digital pattern recognition in searching for the value of the phase-matched laser cavity length (PZT voltage) for establishing mode locking may be difficult to implement with analog circuitry. In addition, the processing of the filtered output from one or more bandpass filters 171–173 based on digital pattern recognition in searching for the value of the DC bias to the modulator 126 during normal mode locking operation of the laser may also be difficult to implement with analog circuitry.

In the laser 100 in FIG. 1, the thermally-controlled chamber 150 encompasses the entire laser cavity 101 to heat the chamber above the environmental temperature. This design may be replaced by a partial active thermal control system where one or more selected thermal-sensitive portions of the laser cavity may be enclosed in the thermal control chamber while the remaining portions of the laser cavity may be left outside the chamber. The variation in these remaining portions of the laser cavity may be compensated for by the fast control mechanism.

Figure 6:
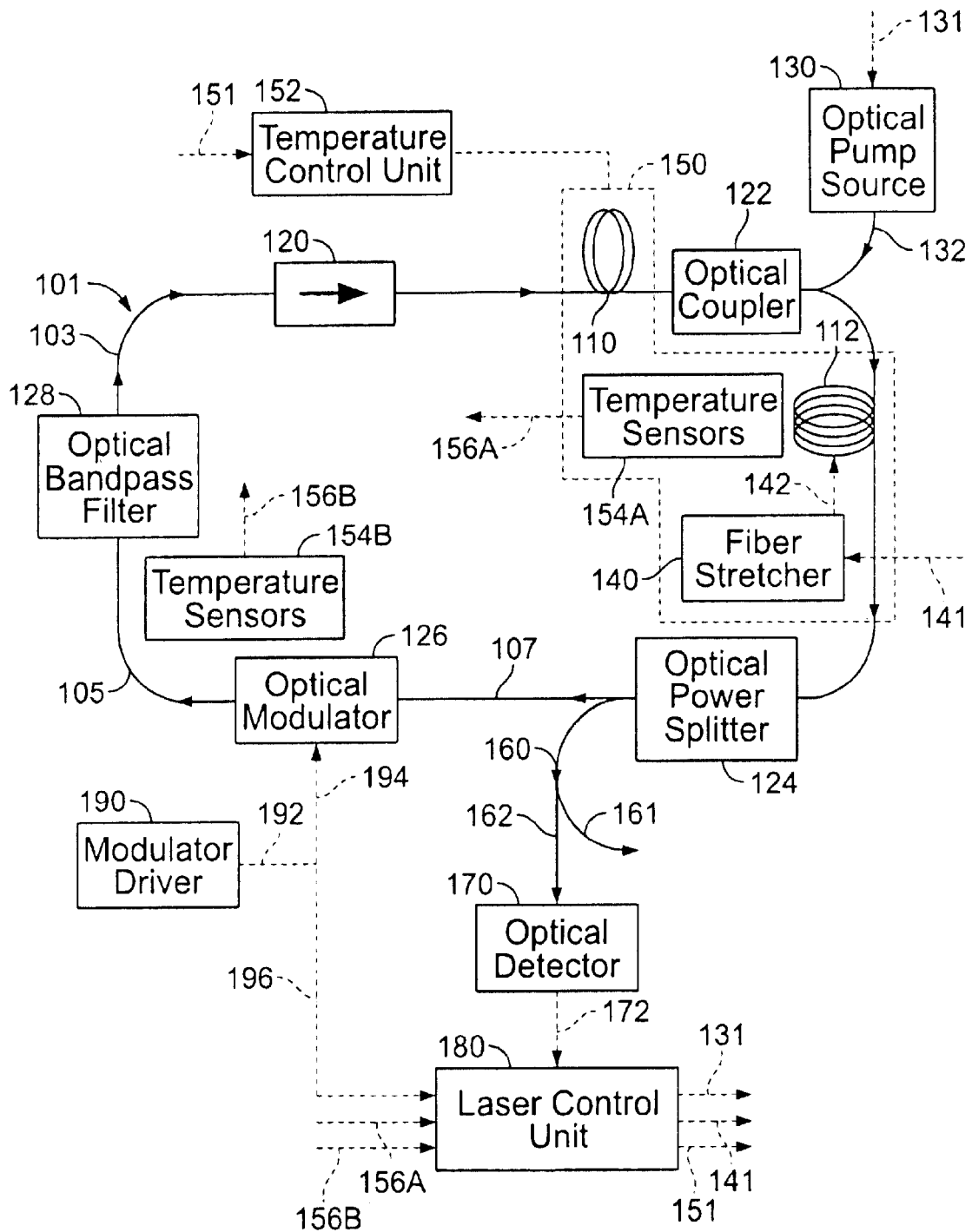
FIG. 6 shows a partial active thermal control of the laser cavity for the laser in FIG. 1.

FIG. 6 shows an alternative design of the laser 100 using the above partial active thermal control. Notably, the fiber segments 110 and 112 may be designed to constitute the majority of the optical path length of the fiber ring 101, e.g., greater than about 80%. Hence, any variations in the physical lengths of the fiber segments 110 and 112 dominate over variations in other fiber segments (less than 3 to 10%) in the fiber ring 101. To reduce the power consumption in thermally stabilizing the fiber ring 101, the thermally controlled chamber or housing 150 may be used to enclose only the fiber segments 110 and 112 while leaving other fiber segments and optical components outside the chamber 150. Additional temperature sensors 150B may also be placed in other parts of the fiber ring 101 outside the thermally-controlled chamber 150. The sensor signals 156B indicating local temperatures at the sensor locations are also fed to the laser control unit 180.

Figure 7:
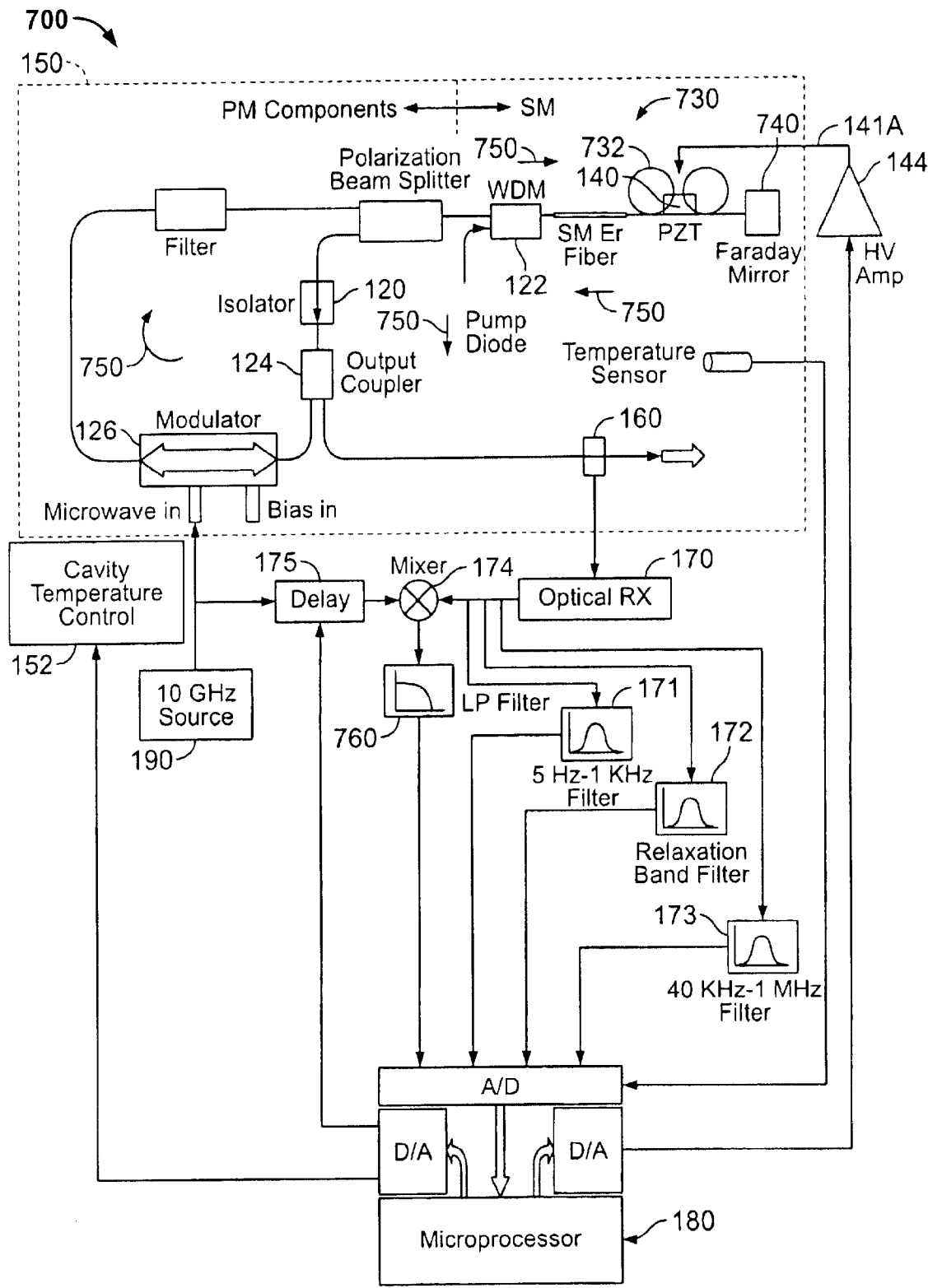
FIG. 7 shows one embodiment of an actively mode-locked fiber laser in a sigma cavity design with a digital feedback control system.

FIG. 7 further shows that the digital control system may be used in a fiber laser in a polarization-stable Sigma fiber laser 700. See, U.S. Pat. No. 5,574,739. The laser cavity includes a first PM fiber part 710 formed of a single-mode PM fiber and a second single-mode fiber part 730 formed of a single-mode fiber. The first fiber part 1110 includes the modulator 126, the optical isolator 120, and the output coupler 124. Two terminals of the fiber part 710 are coupled to two facets of a polarizing beam splitter 720 which is coupled to one end of the second fiber part 730. The other end of the fiber 730 is terminated at a Faraday rotator mirror 740 which reflects light with a 90-degree rotation in polarization. A portion 732 of the second fiber part 730 may be doped as the optical gain medium. The line 750 represents the direction of the light in the optical cavity: light starts from the gain section 732 to be reflected by the reflector 740 and is amplified again before reaching the beam splitter 720. Light in one polarization is selected to be reflected into the first fiber part 710 by the beam splitter 720 and is fed back to the gain section 732 after being modulated by the modulator 126 and passing through the beam splitter 720. Light in the other polarization is suppressed. The second fiber part 1130 may also include a dispersion compensating fiber segment 734 similar to the segment 112 in FIG. 1. The thermal control chamber 150 may be used to enclose the entire laser cavity as in FIG. 1 or only the second fiber part 730 to reduce the power consumption as in FIG. 6. The fiber stretcher 140 may be placed in either of the fiber parts 710 and 730.

Furthermore, since the active control mechanism consumes power in controlling the laser cavity, the total amount of the control over the laser cavity may be partitioned into a passively controlled part and an actively controlled part. The actively controlled part is coupled to and is controlled by the active control mechanism. The passively controlled part, in contrast, is coupled to a passive control unit that does not require a power supply and hence does not consume power. This passive control unit is specially designed to change the dimension of the passively controlled part to negate a change caused the environment temperature. In one embodiment, the passive control unit includes different parts that are formed of materials with different coefficients of thermal expansion. These different parts are engaged to one another and are coupled to the passively controlled part to reduce the optical path length of the laser cavity as the temperature rises and to increase the optical path length as the temperature decreases. In general, this passive control mechanism may be used to perform a portion of the compensation by the active thermal control in the thermally-controlled chamber as part of the slow control mechanism.

Only a few embodiments are disclosed. However, it is understood that variations and enhancements may be made without departing from the spirit of and are intended to be encompassed by the following claims.

What is claimed is:

1. A laser system, comprising:
   an actively mode-locked laser including a laser cavity, and an optical modulator in said laser cavity responsive to a modulation control signal to modulate at least one of an amplitude and a phase of light in said laser cavity at a modulation frequency to lock optical modes of said laser cavity,
   a cavity length control element engaged to said laser cavity to control and adjust a cavity length of said laser cavity in response to a cavity length control signal;
   a thermal control unit to control at least a temperature of a portion of said laser cavity in response to a temperature control signal;
   a thermal sensor coupled to measure a temperature of said portion of said laser cavity under control of said thermal control unit to produce a temperature control signal to said thermal control unit;
   an optical detector receiving a portion of a laser output from said laser cavity to produce a detector output;
   an electrical signal mixer to mix a reference signal split from said modulation control signal with said detector output to produce a mixer output that includes an error signal indicating a frequency difference between said modulation frequency and a multiplicity of a longitudinal mode spacing of said laser cavity;
   a phase delay unit coupled to a signal path of said reference signal to cause a phase delay in said reference signal in response to a phase delay control signal;
   at least one bandpass filter, having a spectral bandwidth covering at least frequencies associated with energy relaxation processes in said laser cavity, and coupled to respectively receive and filter another portion of said detector output to produce a filter output signal indicating noise in said laser output;
   a digital control module to digitally process said filter output signal to extract noise information of said laser output, to digitally process said error signal to extract said frequency difference caused by said laser cavity length, to digitally process said temperature signal to determine a measured temperature of said portion of said laser cavity, wherein said digital control module is operable to produce said cavity length control signal in response to said frequency difference, said temperature control signal, and said phase delay control signal, in response to said noise information of said laser output.

2. The laser system as in claim 1, wherein said optical modulator includes a bias input port to receive a bias control signal to bias said optical modulator, and wherein said digital control module is operable to generate said bias control signal to reduce noise energy in said filter output signal.

3. The laser system as in claim 2, wherein said digital control module is operable to periodically adjust said bias control signal to reduce said noise energy.

4. The laser system as in claim 1, wherein said digital control module is operable to set said phase delay of said phase delay element to minimize energy of said error signal.

5. The laser system as in claim 1, wherein said digital control module is operable to control said cavity length control element to scan said cavity length to determine a selected cavity length from a noise energy pattern as a function of said cavity length to establish mode locking for a first time.

6. The laser system as in claim 1, wherein said digital control module is operable to retrieve laser parameters including a value for said laser cavity length, a value for said phase delay, a value for said temperature for a previous mode-locked operation of said laser to initialize said laser not in a mode-locking condition to establish mode locking.

7. The laser system as in claim 6, wherein said digital control module is operable to control said cavity length control element to scan said cavity length to determine a selected cavity length from a noise energy pattern as a function of said cavity length to establish mode locking.

8. The laser system as in claim 1, wherein said thermal control unit includes a thermal control chamber that encloses the entirety of said laser cavity.

9. The laser system as in claim 1, wherein said thermal control unit includes a thermal control chamber that encloses only a portion of said laser cavity.

10. The laser system as in claim 1, wherein said laser cavity is a ring cavity.

11. The laser system as in claim 10, wherein said ring cavity comprises a fiber ring.

12. The laser system as in claim 11, wherein said fiber ring includes a first fiber portion and a second fiber portion that have opposite chromatic dispersions relative to each other.

13. The laser system as in claim 1, wherein said cavity length control element includes a piezo-electric element.

14. The laser system as in claim 1, wherein said laser cavity is formed of fiber and includes:
   a first fiber part formed of a single-mode fiber that maintains a polarization of light;
   a polarizing beam splitter having a first optical facet coupled to a first terminal of said first fiber part, a second optical facet coupled to a second terminal of said first fiber part, and third optical facet opposing said first optical facet, said polarizing beam splitter configured to reflect light of a first polarization received from said third optical facet to said first optical facet and into said first terminal and to transmit light of said first polarization received from said second optical facet from said first fiber part to reach said third optical facet;
   a second fiber part formed of a single-mode fiber and having a first terminal coupled to said third optical facet to exchange light with said first fiber part and a second terminal; and
   a Faraday rotator mirror coupled to said second terminal of said second fiber part to reflect light from said first terminal back with a rotation of 90 degrees in polarization.

15. The laser system as in claim 14, wherein said thermal control unit includes a thermal control chamber that encloses only one portion of said laser cavity, said laser system further comprising a passive thermal control element coupled to a portion of said laser cavity that is not enclosed in said thermal control chamber, wherein said passive thermal control element operable to adjust said cavity length of said laser cavity to negate an effect of thermal expansion without receiving power from a power supply.

16. The laser system as in claim 1 or claim 14, wherein said thermal control unit includes a thermal control chamber that encloses only one portion of said laser cavity, said laser system further comprising a passive thermal control element coupled to a portion of said laser cavity that is not enclosed in said thermal control chamber, wherein said passive thermal control element operable to adjust said cavity length of said laser cavity to negate an effect of thermal expansion without receiving power from a power supply.

17. The laser system as in claim 16, wherein said passive control element includes two different materials with different thermal expansion coefficients.

18. The laser system as in claim 1, wherein said digital control module is configured to lock the optical modes by:
  controlling at least one of said cavity control element and said thermal control unit to set an operating temperature of said thermal control unit;
  scanning said cavity control element through an operating adjustment range of the cavity length to find a cavity length value at which output of said at least one optical bandpass filter is at or near a minimum energy,
  applying a DC bias in said cavity control element to bias the cavity length at said value;
  applying a modulation to the cavity length to set the output of said at least one optical bandpass filter at or near the minimum energy; and
  adjusting said phase delay unit to set a value of the phase delay at which the optical modes lock.

19. The laser system as in claim 1, wherein said digital control module is configured to maintain locking of the optical modes by setting mixer output from said electrical signal mixer to be at a minimum.

20. The laser system as in claim 1, wherein said digital control module is configured to adjust a DC bias of said optical modulator while maintaining locking of the optical modes, wherein the adjustment comprises:
  controlling the cavity length control element to minimize an energy of the output of said at least one bandpass filter;
  adjusting the DC bias of said optical modulator at which the energy of the output of said at least one bandpass filter is minimized,
  adjusting the thermal control unit to set the temperature near a center of an operating range; and
  controlling the cavity length control element to minimize the mixer output of said electrical signal mixer.

* * * * *